March 21, 1967 D. E. LAWSON 3,310,300
LOAD BEARING UNIT

Filed Feb. 1, 1965 2 Sheets-Sheet 1

INVENTOR.
DAVID E. LAWSON
BY
Andrus & Starke
ATTORNEYS

INVENTOR.
DAVID E. LAWSON
BY
Andrus & Starke
ATTORNEYS

United States Patent Office 3,310,300
Patented Mar. 21, 1967

3,310,300
LOAD BEARING UNIT
David E. Lawson, 553 McIntyre Lane,
Maumee, Ohio 43537
Filed Feb. 1, 1965, Ser. No. 429,235
6 Claims. (Cl. 267—111)

This invention relates to a load bearing unit and more particularly to a foam plastic load bearing unit reinforced with woven mesh.

According to the invention, the load bearing unit, such as a seating structure, includes a foam plastic cushion supported by a frame. The cushion is reinforced with a sheet of woven reinforcing mesh which is embedded within the cushion and bonded to the foam plastic. The mesh is a woven type in which the interlaced woof and warp strands are not welded or tied together at their points of cross-over. Thus, the strands are free to move relative to each other. The sheet of woven mesh is disposed diagonally with respect to opposed sides of the frame so that, at most, one end of each strand is attached to the frame and the opposite end of each strand is not attached to the frame and is embedded within the cushion. In the unloaded condition, the woof strands are located approximately 90° with respect to the warp strands so that the openings between the strands are generally rectangular in shape.

When a load is applied to the cushion, the sheet of mesh is forced downwardly to a generally concave shape which causes the strands to move relative to each other so that the openings between the strands, instead of being rectangular, are changed to a diamond shape. This relative adjustment of the strands causes a portion of the foam plastic located within the openings to be stretched in tension, while a second portion of the foam plastic within each opening is compressed. This stretching and distortion of the foam plastic serves to resist further loading.

As an additional feature, the sheet of mesh can be attached to the opposite portions of the frame by use of coil springs. The coil springs are embedded within and bonded to the foam plastic, and as a load is applied to the unit, the convolutions of the spring will tend to separate or spread apart with the result that the foam plastic bonded to the convolutions will also be stretched and distorted. This stretching of the foam plastic also serves to resist further loading, and provides a degree of resiliency at high load conditions after the mesh is in full shear condition.

The load bearing unit of the invention is an integral structure which can be fabricated in a single molding operation and this simplifies the fabrication and reduces the overall cost of the unit.

Other objects and advantages will appear in the course of the following description.

The drawings illustrate the best mode presently contemplated of carrying out the invention.

Figure 1:
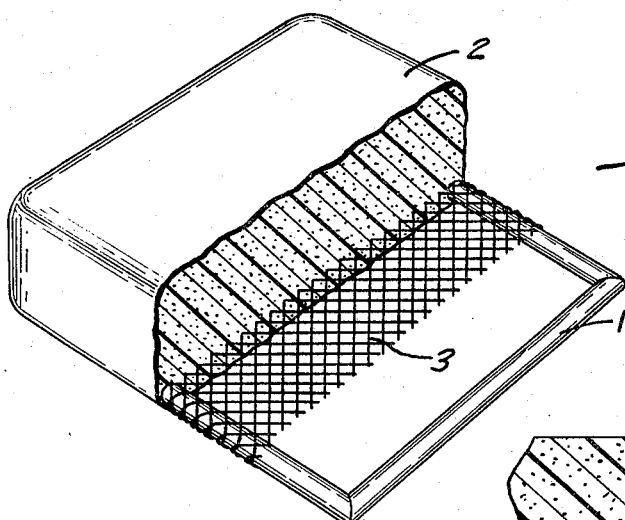
FIG. 1 is a perspective view with parts broken away showing the load bearing structure of the invention under no-load conditions.
Figure 2:
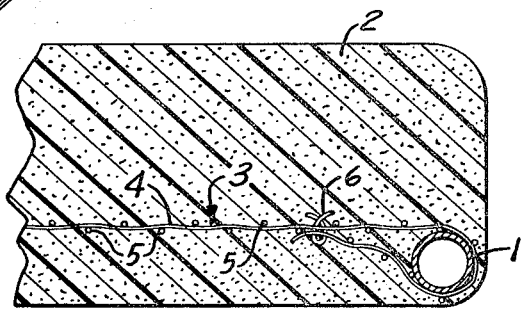
FIG. 2 is an enlarged fragmentary vertical section taken through the load bearing unit and showing attachment of the reinforcing mesh to the frame.
Figure 3:
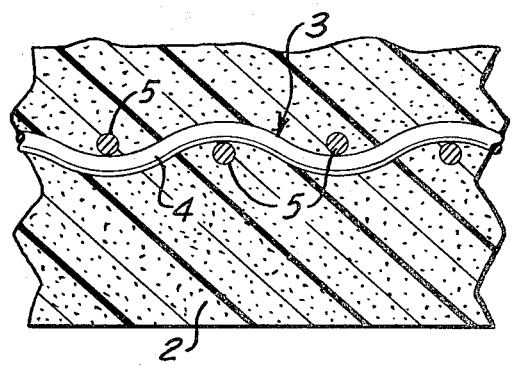
FIG. 3 is an enlarged vertical section taken through the cushion and showing the interwoven strands of the reinforcing mesh.

FIG. 1 illustrates a molded seating structure including a generally rectangular frame 1 which supports a foam plastic cushion 2. A woven mesh sheet 3 of reinforcing material is attached to opposite portions of the frame and is embedded within the cushion 2 and bonded to the foam plastic material.

The frame 1 is shown as a tubular metal structure; however, it is contemplated that the frame can have any desired cross-sectional contour and can be made of other suitable materials, such as plastic, wood and the like.

The foam plastic cushion 2 extends upwardly from the mesh sheet 3 a distance about 2 to 4 inches and defines a crown or load bearing surface. The cushion can be formed of any conventional foam plastic or resin such as polyurethane, polyvinylchloride, polyethylene, polyester blends and the like.

The foam plastic cushion 2 can be formed of any conventional foam plastic or resin such as polyurethane, polyvinylchloride, polyethylene, polyester blends and the like.

The use of flexible urethane foams has proven very satisfactory and these foams are created by reacting a polyisocyanate with a polyol and water in the presence of a catalyst. The reaction between the water and the isocyanate liberates carbon dioxide which functions as a flowing agent to create a cellular structure. In some cases fluorocarbon blowing agents such as monofluorochloromethane or difluorochloromethane, can be used to create the cellular structure. These high molecular weight gases boil at low temperatures under the exothermic heat of the reaction between the isocyanate and the polyol.

The principal polyols used to prepare the polyurethane foam are polyesters and polyethers. The polyesters include those based on adipic acid, dimer acid or castor oil, while the polyethers include polypropylene glycol of 2000 molecular weight and triols with molecular weights up to 4000 that are propylene oxide adducts of glycerine. As a specific example, the polyurethane foam can be prepared by reacting polytetramethylene ether glycol with 2,4-toluene diisocyanate.

The reinforcing mesh 3 is formed of a series of interwoven woof strands 4 and warp strands 5 which can be formed of metal wire, such as steel, or fibrous materials such as glass, asbestos, cotton, wool, nylon, rayon, Dacron, orlon, and the like. The mesh is a type such that the strands 4 and 5 are not attached to each other at their points of cross-over, and are freely movable with respect to each other. When the seating structure is in the unloaded condition, as shown in FIG. 1, the strands 4 are generally parallel to each other and, similarly, the strands 5 are generally parallel to each other and are positioned approximately 90° with respect to strands 4. Thus, in the non-loaded state the openings in the mesh, defined by the strands 4 and 5, are generally equal in area and are rectangular in shape.

Opposite edge portions of the sheet 3 are wrapped around the frame 1 in a reverse bend and the overlapped areas of the reinforcing sheet are connected together by a series of hog rings 6.

The reinforcing mesh sheet 3 is disposed diagonally, or on the bias, with respect to the side edges of the frame so that the strands 4 and the strands 5 are both disposed at an angle of approximately 45° with respect to the side portions of the frame. One end of each woof strand 4 is attached to the frame while the other end of each woof strand is not attached to the frame. Similarly, one end of each of the warp strands 5 is secured to the frame 1 and the other end of each warp strand is not attached to the frame. With this diagonal arrangement, the strands 4 and 5 are free to move relative to each other as a load is applied to the cushion. If the sheet 3 is elongated and has a greater length than width, some of the strands 4 and 5 in the central portion of the sheet may not be attached to the frame at all and are held in place, prior to molding, by their interwoven nature. It is important that at least one end of each of the strands 4 and 5 is free and not attached to the frame so that the strands can move relative to each other when a load is applied to the cushion. Depending on the width of the seat and the angularity of the strands, some of the strands located at the central portion of the seat may not be attached at either end to the frame.

Figure 4:
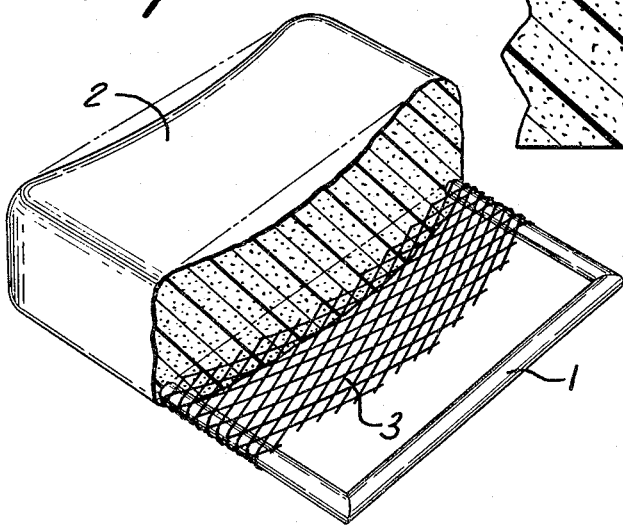
FIG. 4 is a perspective view similar to FIG. 1 showing the seating structure under loaded conditions.

When a load is applied to the upper surface of the cushion 2, the cushion is depressed and similarly the reinforcing mesh 3 will be depressed to a generally concave shape, as shown in FIG. 4. As the woven mesh 3 is deformed the strands 4 and 5 move relative to each other so that the openings defined by the strands 4 and 5 have a generally diamond shape under the loaded conditions.

Figure 5:
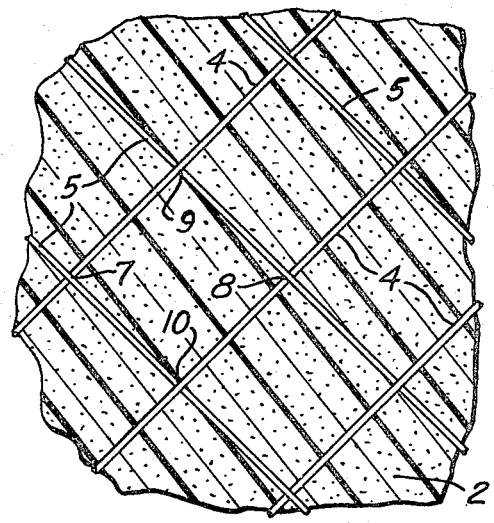
FIG. 5 is a schematic view showing the strands in the unloaded condition.
Figure 6:
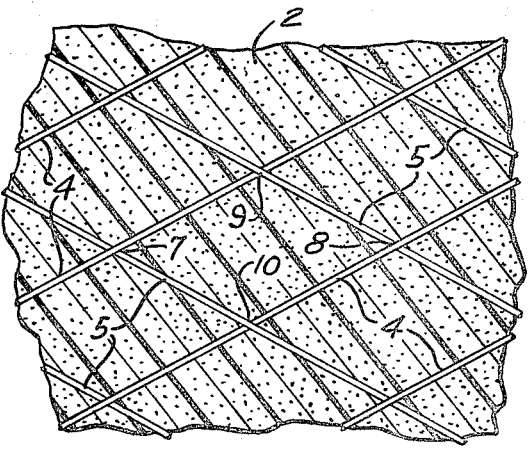
FIG. 6 is a view similar to FIG. 5 showing the strands in the loaded condition.

FIGS. 5 and 6 are schematic representations showing the movement of the strands. In FIG. 5, the sheet is in the unloaded condition and the openings defined by the strands 4 and 5 are generally square and the points of cross-over of the strands are indicated as 7, 8, 9 and 10. As a load is applied to the cushion, the strands move relative to each other to take the arrangement shown in FIG. 6 so that the openings defined by the strands are then generally diamond shaped. In moving or adjusting to this diamond shape, the portion of the foam plastic extending between the points of cross-over 7 and 8 is stretched in tension while the portion of the foam plastic located between points of cross-over 9 and 10 is compressed. This distortion of the foam plastic serves to resist further loading. As the load on the cushion 2 is reduced, the resiliency of the foam plastic will return the strands 4 and 5 to their original shape as shown in FIG. 5.

While the above description has been directed to a single sheet of reinforcing material 3 it is contemplated that a series of generally parallel sheets may be employed if desired, or other reinforcing means may be embedded in the cushion along with the sheet 3. Similarly, the drawings show the sheet 3 to be flat or planar, but it is contemplated that the sheet can be domed or otherwise nonplanar and can be provided with surface deviations such as bends, corrugations or the like.

Figure 7:
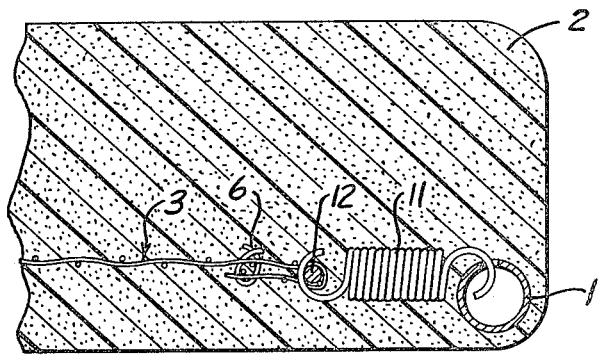
FIG. 7 is a fragmentary vertical section of a modified form of the invention in which the reinforcing mesh is connected to the frame by a series of coil springs.

FIG. 7 illustrates a modified form of the invention, in which an additional degree of resiliency is provided by connecting the reinforcing mesh 3 to the frame 1 by a series of helical extension or coil springs 11. In this embodiment, the outer end of each spring 11 is engaged within an opening in the tubular frame 1 and the inner end of each spring is disposed around a rod 12 which extends within the overlapped side edges of the sheet 3. As in the case of the first embodiment, the overlapped side portions of the sheet 3 are secured together by the hog rings 6.

The coil springs 11 are embedded within the cushion 2 and bonded to the foam plastic. The mesh 3 functions in the manner previously described in the first embodiment. In addition to the action of the mesh 3, the springs 11 will extend or elongate as a load is applied to cushion 2. As the convolutions of the coil spring are bonded to the foam plastic, the foam plastic bonded to the convolutions will be stretched and distorted as the spring is extended, and this distortion or stretching of the foam plastic resists further loading of the seating structure. The use of the helical extension springs 11 provides a degree of flexibility or resiliency at high load conditions after the reinforcing mesh is in a full shear condition and also adds faster recoil characteristics to the seat structure.

Various modes of carrying out the invention are contemplated as being within the scope of the following claims particularly pointing out and distinctly claiming the subject matter which is regarded as the invention.

I claim:

1. A load bearing unit, comprising a frame, a foam plastic cushion supported on the frame, and flexible reinforcing means embedded within the cushion and bonded to the foam plastic, said reinforcing means including a first series of spaced strands and a second series of spaced strands disposed in lapping relation and at an angle to said first strands, said second strands being free from attachment to the first strands and being freely movable with respect to said first strands, said first and second strands defining a plurality of openings in said reinforcing means and the foam plastic being disposed within said openings, at least one end of each of said first and second strands being free of attachment to said frame, whereby the first and second strands can move relative to each other as a load is applied to the cushion to thereby stretch and distort the foam plastic disposed within said openings.

2. A load bearing unit, comprising a frame, a foam plastic cushion supported on the frame, and flexible reinforcing means embedded within the cushion and bonded to the foam plastic, said reinforcing means including a first series of spaced generally parallel strands and a second series of spaced generally parallel strands interwoven with the first strands and disposed at an angle of approximately 90° to said first strands, said second strands being free from attachment to the first strands and being freely movable with respect to said first strands, said first and second strands defining a plurality of generally rectangular openings in said reinforcing means and the foam plastic being disposed within said openings, at least one end of each of said first and second strands being free of attachment to said frame, whereby the first and second strands can move relative to each other as a load is applied to the cushion to thereby stretch and distort the foam plastic disposed within said openings.

3. A load bearing unit, comprising a frame having a pair of opposed portions, a foam plastic cushion supported on the frame, and flexible reinforcing means embedded within the cushion and bonded to the foam plastic, said reinforcing means including a series of spaced generally parallel woof strands and a series of spaced generally parallel warp strands with said woof and warp strands being interwoven, said woof strands being free of attachment from the warp strands and being freely movable with respect to said warp strands and said woof and warp strands defining a plurality of openings in the reinforcing means with the foam plastic being disposed within the openings, said reinforcing means being attached to said opposed portions of the frame and both the woof and warp strands extending diagonally with respect to said opposed portions and at least one end of each of said woof and warp strands being free of connection to the frame whereby the woof and warp strands can move relative to each other as the load is supplied to the cushion to thereby stretch and distort the foam plastic disposed within the openings.

4. The structure of claim 3 in which the cushion extends upwardly from said reinforcing sheet a distance of 2 to 4 inches to provide a crown.

5. The structure of claim 1 in which the strands are made of metal wire.

6. The structure of claim 3 in which the reinforcing means is connected to the frame by a series of coil springs and said coil springs are embedded within the cushion and bonded to the foam plastic whereby the foam plastic bonded to the coil springs will stretch and distort as a load is applied to the cushion to thereby resist further loading.

(References on following page)

References Cited by the Examiner

UNITED STATES PATENTS

| | | | |
|---|---|---|---|
| 3,084,980 | 4/1963 | Lawson | 297—455 |
| 3,140,086 | 7/1964 | Lawson | 267—111 |
| 3,195,955 | 7/1965 | Richardson et al. | 297—452 |
| 3,208,085 | 9/1965 | Grimshaw | 5—345 |
| 3,210,782 | 10/1965 | Buist et al. | 5—361 |

FOREIGN PATENTS

| | | |
|---|---|---|
| 939,343 | 10/1963 | Great Britain. |
| 976,899 | 12/1964 | Great Britain. |

FRANK B. SHERRY, *Primary Examiner.*

CASMIR A. NUNBERG, *Examiner.*